United States Patent
Hardy et al.

(10) Patent No.: US 7,585,010 B2
(45) Date of Patent: Sep. 8, 2009

(54) SUPPORT DEVICE FOR VEHICLES (75) Inventors: David R. Hardy, Hephzibah, GA (US); Gary L. Lewis, Evans, GA (US); Duane E. Newman, Evans, GA (US); Geoff D. Stewart, Evans, GA (US)

(73) Assignee: Club Car, Inc., Evans, GA (US)

( * ) Notice: Subject to any disclaimer, the term of this patent is extended or adjusted under 35 U.S.C. 154(b) by 0 days.

(21) Appl. No.: 10/543,872

(22) PCT Filed: Jan. 27, 2004

(86) PCT No.: PCT/US2004/002238

§ 371 (c)(1), (2), (4) Date: Feb. 13, 2007

(87) PCT Pub. No.: WO2004/067327

PCT Pub. Date: Aug. 12, 2004

(65) Prior Publication Data

US 2007/0152463 A1 Jul. 5, 2007

Related U.S. Application Data (60) Provisional application No. 60/443,250, filed on Jan. 28, 2003.

(51) Int. Cl.
*B60R 9/08* (2006.01)
*B60R 13/07* (2006.01)
*B62D 25/07* (2006.01)

(52) U.S. Cl. .............................. 296/37.16; 280/DIG. 5; 296/213

(58) Field of Classification Search ................ 296/37.1, 296/37.16, 77.1, 79, 102, 181.3, 182.1, 208, 296/213; 280/DIG. 5
See application file for complete search history.

(56) References Cited

U.S. PATENT DOCUMENTS

| D187,858 S | 5/1960 | Pollock |
| 3,269,683 A | 8/1966 | Shinaver |
| 3,606,229 A | 9/1971 | Wall |
| 4,008,874 A | 2/1977 | Conway, Jr. |
| 4,332,415 A | 6/1982 | Williams |
| 4,355,746 A | 10/1982 | Casady |

(Continued)

FOREIGN PATENT DOCUMENTS

WO    WO 02099773 A 2    * 12/2005 ................ 296/37.1

*Primary Examiner*—Glenn Dayoan
*Assistant Examiner*—Paul A Chenevert
(74) *Attorney, Agent, or Firm*—Michael Best & Friedrich LLP (57) ABSTRACT

A support device is for a vehicle having a body, a roof spaced above the body and a seat back. The support device includes a base or body connectable with the vehicle and having a mounting portion configured for attachment of the seat back and a recess providing a storage space. A roof support has a first end connected with the base and a second end connectable with the roof. The roof support is configured to retain the roof spaced generally above a remainder of the vehicle. Preferably, the roof support includes two struts extending between the base and the roof, the base transferring the weight of the roof from the struts and to the vehicle body. Preferably, the struts each include a fluid passage extending between the roof and the base, the passage being configured to discharge fluid beneath the vehicle body.

31 Claims, 10 Drawing Sheets

U.S. PATENT DOCUMENTS

| | | | |
|---|---|---|---|
| 4,533,013 A | 8/1985 | Hightower |
| 4,645,167 A | 2/1987 | Hardwick |
| 4,930,591 A | 6/1990 | Lanius et al. |
| 5,094,500 A | 3/1992 | Maypole et al. |
| 5,105,958 A | 4/1992 | Patton |
| 5,180,089 A | 1/1993 | Suman et al. |
| 5,282,554 A | 2/1994 | Thomas |
| 5,356,061 A | 10/1994 | Yu |
| 5,393,118 A | 2/1995 | Welborn |
| 5,411,237 A | 5/1995 | Dougherty |
| 5,429,290 A | 7/1995 | Greene, Jr. |
| 5,474,273 A | 12/1995 | Vinal |
| 5,480,078 A | 1/1996 | Verrette et al. |
| 5,588,690 A | 12/1996 | Showalter |
| 5,599,037 A | 2/1997 | Spickler |
| 5,674,046 A | 10/1997 | Meyer |
| 5,687,443 A | 11/1997 | Moore |
| 5,727,642 A | 3/1998 | Abbott |
| 5,820,093 A | 10/1998 | Murray |
| 5,842,535 A | 12/1998 | Dennis |
| 5,950,617 A | 9/1999 | Lorenz |
| 5,975,549 A | 11/1999 | Ockenden |
| 5,979,724 A | 11/1999 | Loewenthal et al. |
| 6,079,600 A | 6/2000 | Linker et al. |
| 6,183,029 B1 | 2/2001 | Deaton |
| 6,186,584 B1 | 2/2001 | Samuelson et al. |
| 6,227,505 B1 | 5/2001 | Van Order et al. |
| 6,227,556 B1 | 5/2001 | Ockenden |
| 6,238,171 B1 | 5/2001 | Carter |
| 6,318,687 B2 | 11/2001 | Trana et al. |
| 6,394,555 B2 | 5/2002 | Mizuta et al. |
| 6,416,109 B1 | 7/2002 | Tyrer et al. |
| 6,422,641 B1 | 7/2002 | Coryell |
| 6,422,651 B1 | 7/2002 | Muhlberger et al. |
| 6,457,618 B1 | 10/2002 | Hancock et al. |
| 6,481,679 B1 | 11/2002 | Bennett et al. |
| 6,592,093 B2 | 7/2003 | Valentz |
| D482,261 S | 11/2003 | Kobayashi |
| 6,808,231 B1 | 10/2004 | Hill |
| 6,892,992 B2 | 5/2005 | Donahue |
| 6,986,446 B2 | 1/2006 | Murray et al. |
| 7,044,344 B2 | 5/2006 | Winkler |
| D528,539 S | 9/2006 | McClaude |
| 7,175,223 B1 * | 2/2007 | Tyrer ..................... 296/100.14 |
| 7,364,216 B2 * | 4/2008 | Tyrer ..................... 296/100.14 |
| 7,396,066 B2 * | 7/2008 | Houston ...................... 296/69 |
| 7,422,082 B2 * | 9/2008 | Reffitt ....................... 180/90.6 |
| 2002/0056728 A1 | 5/2002 | Winkler |
| 2002/0145095 A1 | 10/2002 | Winkler |
| 2002/0145302 A1 | 10/2002 | Winkler |
| 2002/0153462 A1 | 10/2002 | Donahue |
| 2003/0062456 A1 | 4/2003 | Nakagawa et al. |
| 2003/0209918 A1 | 11/2003 | Cheek et al. |
| 2004/0108348 A1 | 6/2004 | Barnes |
| 2004/0112774 A1 | 6/2004 | Winkler |
| 2004/0124317 A1 | 7/2004 | Wallaker |
| 2005/0048348 A1 | 3/2005 | Bazzarella |
| 2005/0121483 A1 | 6/2005 | Barnes |
| 2005/0224539 A1 | 10/2005 | Hardy et al. |
| 2005/0242255 A1 | 11/2005 | Sturt et al. |
| 2007/0290521 A1 * | 12/2007 | Houston .................. 296/182.1 |

* cited by examiner

SUPPORT DEVICE FOR VEHICLES

RELATED APPLICATIONS

This application is a 371 of PCT/US2005/002238, filed on Jan. 27, 2004, which claims the benefit of U.S. Provisional Patent Application 60/443,250, filed on Jan. 28, 2003.

This application claims priority to U.S. Provisional Application Ser. No. 60/443,250, filed Jan. 28, 2003, the entire contents of which are incorporated herein by reference.

BACKGROUND OF THE INVENTION

The present invention relates to vehicles such as golf cars, utility vehicles, NEVs (Neighborhood Electric Vehicles), etc., and more particularly to support assemblies for such vehicles.

Vehicles such as golf cars, utility vehicles and NEVs are known and each type of vehicle basically includes a frame, a body mounted upon the frame, three or four wheels rotatably connected to the frame and a drive system for driving the wheels to mobilize the vehicle. Typically, such vehicles include a seat mounted on the vehicle body for seating at least a driver and generally also one or more passengers. Further, such vehicles also generally include a roof or canopy disposed above the body by means of several struts, typically four, extending between the frame or body and the canopy.

SUMMARY OF THE INVENTION

In one aspect, the present invention is a support device for a vehicle having a seat back. The support device comprises a body connectable with the vehicle. The body has a mounting surface configured for attachment of the seat back and a recess providing a storage space.

In another aspect, the present invention is a support device for a vehicle having a roof and a seat back. The support device comprises a base connectable with the vehicle and configured to support the seat back. A roof support has a first end connected with the base and a second end connectable with the roof. The roof support is configured to retain the roof spaced generally above a remainder of the vehicle.

In a further aspect, the present invention is also a support device for a vehicle having a body and a roof spaced generally above the body. The support device comprises a base disposeable upon the vehicle body and having a recess providing a storage space. The device also includes two struts, each strut having a first end connected with the base and a second end connectable with the roof. The two struts at least partially retain the roof spaced above the vehicle body and the base transfers the weight of the roof from the struts and to the vehicle body.

In yet another aspect, the present invention is again a support device for a vehicle having a body with the lower surface and a roof spaced generally above the body. The support device comprises a base connectable with the vehicle and two struts. Each strut has a first end connected with the base and a second end connectable with the roof. Each strut further has a passage extending between the first and second ends and providing a fluid path configured to discharge fluid beneath the body lower surface.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "right", "left", "lower", "upper", "upward", "down" and "downward" designate directions in the drawings to which reference is made. The words "inner", "inwardly" and "outer", "outwardly" refer to directions toward and away from, respectively, the geometric center of a support device 10 or an element of the device 10 being described, the particular meaning being readily apparent from the context of the description. Further, as used herein, the word "connected" is intended to include direct connections between two members-without any other members interposed therebetween and indirect connections between members in which one or more other members are interposed therebetween. The terminology includes the words specifically mentioned above, derivatives thereof, and words or similar import.

Referring now to the drawings in detail, wherein like numbers are used to indicate like elements throughout, there is shown in FIGS. 1-13 a presently preferred embodiment of a support device 10 for a vehicle 1 having a roof 2 and a seat back 3. The support device 10 basically comprises a base 12 including a generally rectangular body 14 connectable with, and preferably removably connectable with, the vehicle 1.

The body 14 has a mounting portion 16 configured for attachment of the seat back 3 and a recess 32 providing a storage space SB for stowing a variety of items. Preferably, the support device 10 also includes a roof support 20 having a first end 22 connected with the base 12 and a second end 24 connectable with the roof 2. The roof support 20 is configured to retain the roof 2 spaced generally above a remainder of the vehicle 1, as discussed below. Further, the roof support 20 preferably includes two spaced-apart struts 26, each strut 26 having a lower end 26a connected with the base 12 and an upper end 26b connectable with the roof 2. Each strut 26 is preferably formed so as to provide a downspout 27 for draining fluid (i.e., rainwater) from the roof 2, as described in further detail below. Having discussed the basic elements of the support device 10, a detailed description of each of these and other components is provided below.

Figure 1:
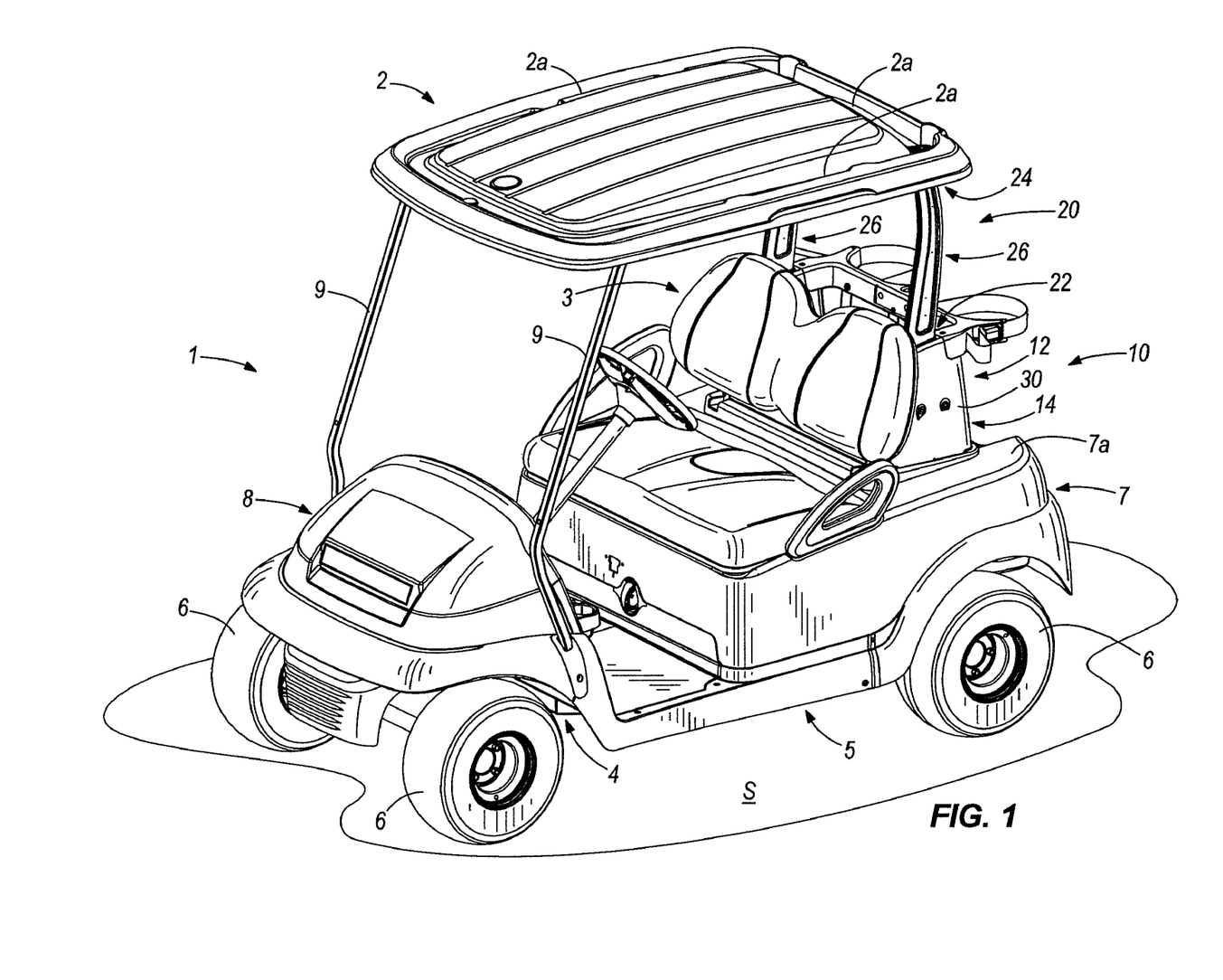
FIG. 1 is a side perspective view of a vehicle including a support device in accordance with the present invention.
Figure 2:
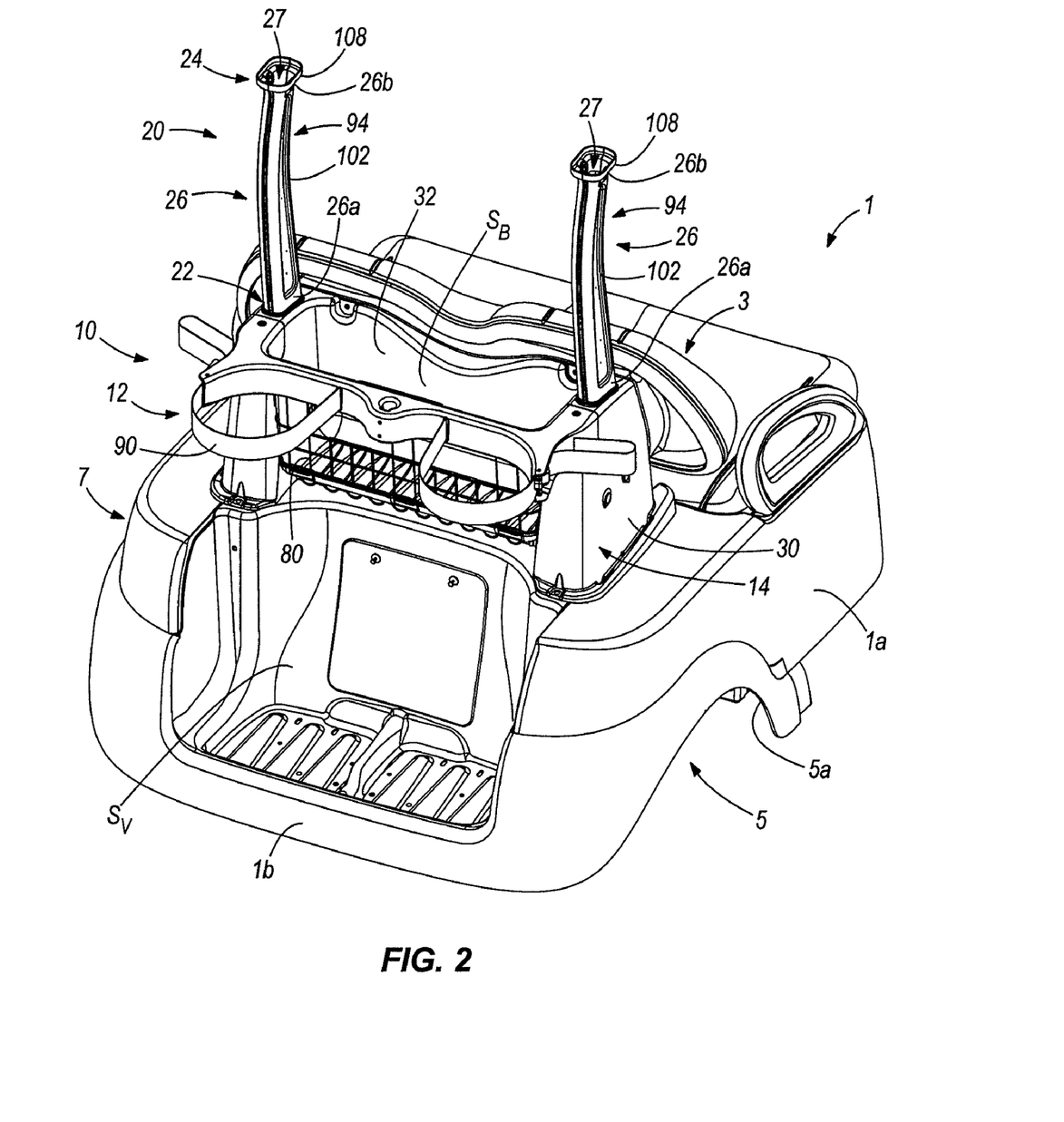
FIG. 2 is a rear perspective view of a rear body portion of the vehicle with the support device mounted thereon.
Figure 3:
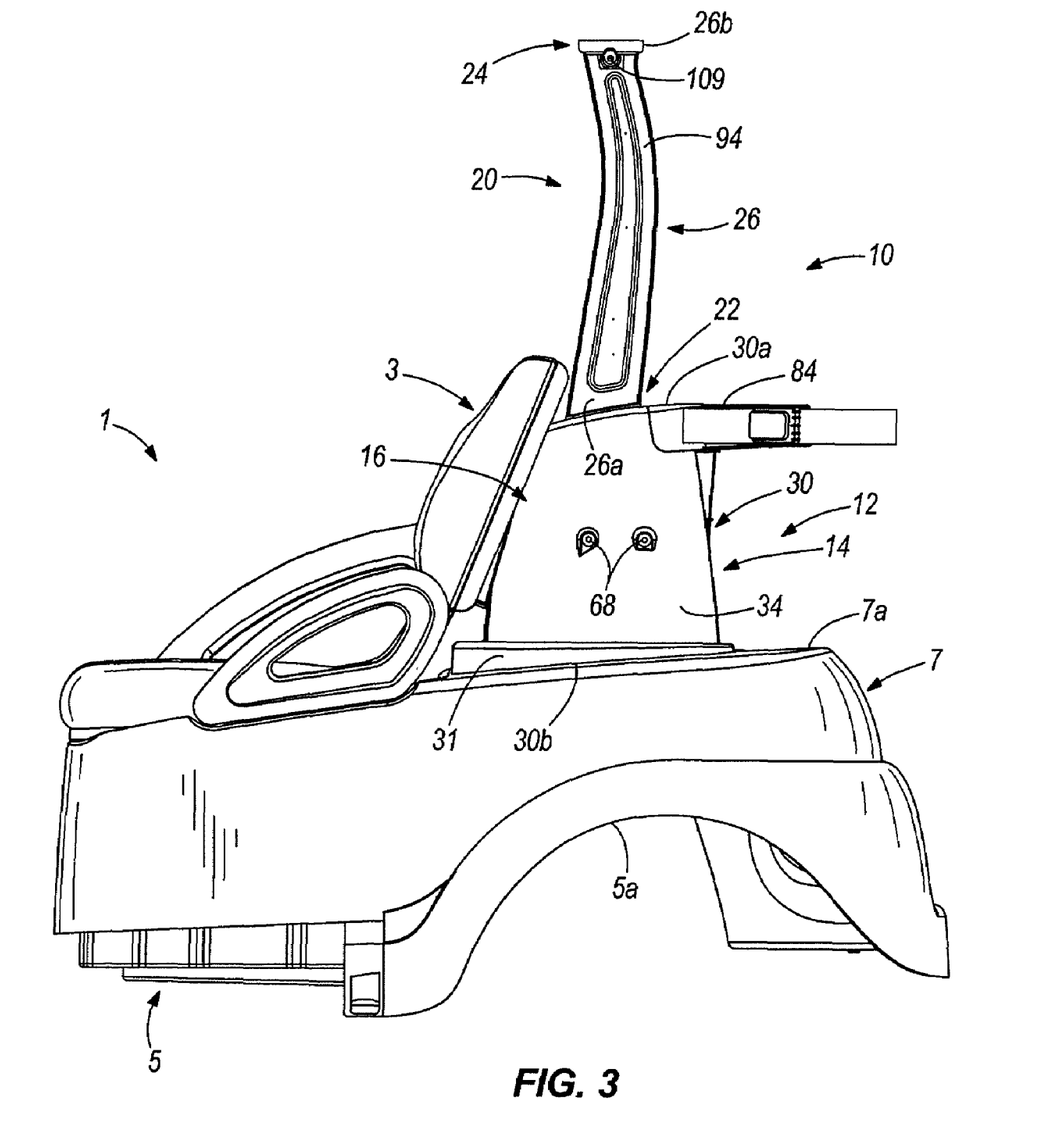
FIG. 3 is a side elevational view of the support device and the rear body portion.

Referring first to FIGS. 1-3, the support device 10 of the present invention is preferably used with the category of generally light-weight, relatively limited range vehicles that includes golf cars, utility vehicles, neighborhood electric vehicles ("NEVs") and similar types of vehicles. Preferably, the vehicle 1 includes a frame 4, a body 5 mounted to the frame 4 and a plurality of wheels 6 (e.g., three or four) rotatably mounted to the frame 4 for mobilizing the vehicle 1. The body 5 preferably includes a rear body portion 7 having an upper, generally flat mounting surface 7a to which the support device 10 is preferably mounted as discussed below. A storage space $S_V$ is preferably formed in the rear end of the rear body portion 7 and is sized to receive the lower ends of two golf bags (none shown), the upper ends of which are supported by the support device 10 as described in further detail below.

Figure 5:
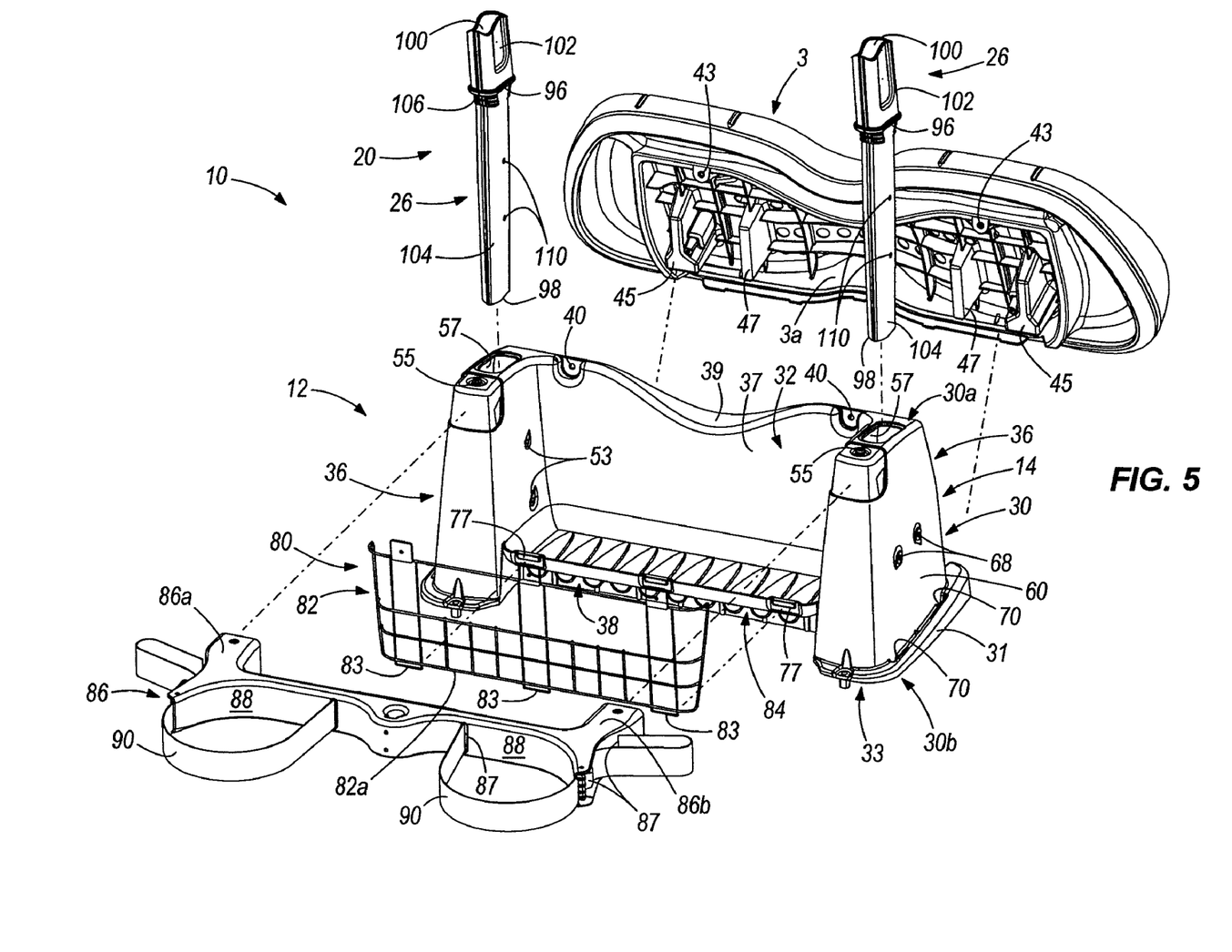
FIG. 5 is a partially broken-away, exploded view of the support device and a seat back, taken from the rear.

Preferably, the vehicle 1 also has a front body portion 8 and a pair of front struts 9, such that the roof 2 is supported above the remainder of the vehicle 1 by both the roof support 20 and the front struts 9. As best shown in FIG. 5, the seat back 3 preferably has two threaded mounting holes 43, a pair of connective blocks 45, each block 45 having a notch (not shown), and a pair of locator and support tabs 47, each of the two blocks 45 and two tabs 47 extending from the rear end 3a of the seat back 3 and used to connect the back 3 with the base 12, as described below. In addition, the roof 2 preferably has a pair of integral fluid channels or gutters 2a, each gutter 2a being provided with a drain portion 2b for draining or discharging fluid, such as rainwater, from the gutter 2a.

Although the support device 10 is preferably used with a vehicle 1 as described above, the support device 10 may alternatively be used with any other vehicle 10 for which the device 10 may be useful. For example, the support device 10 may be used with any other type of vehicle, such as for example, tractors, lawnmowers, etc. Further, the vehicle 1 may have a body 5 formed in any other appropriate manner, such as being formed by a plurality of body panels and/or formed without the rear storage space $S_V$, and/or the support device 10 may be connectable directly to the frame 4 (i.e., instead of through the body 5). Further for example, the support device 10 may be used with a vehicle 1 that does not include a canopy or roof 2, in which case the support device 10 would not include a roof support 20, as discussed below. The scope of the present invention encompasses these and all other alternative vehicle structures and the present invention is not limited to being used with any particular vehicle 1.

Referring now to FIGS. 1-7, the base body 14 is preferably formed as a generally rectangular-shaped block 30 disposeable upon the body upper surface 7a and having a relatively large recessed portion 32 defining the storage space $S_B$. The block 30 has an upper end 30a, an open lower end 30b providing an opening 33 extending into an interior space $S_I$, and a base ledge 31 extending about the outer perimeter of the lower opening 33. Preferably, the block 30 is primarily formed of four wall sections or walls 34, 36 and 38; a front vertical wall 34, two spaced-apart vertical side walls 36 extending rearwardly from the front wall 34 and a horizontal wall 38 extending between the three vertical walls 34 and 36. The four primary walls 34, 36 and 38 (each being described in detail below) are preferably integrally connected or formed such that the base body 14 has the preferred structure of a one-piece construction block 30. However, the base body 14 may alternatively be assembled from two or more components or members, provided by a solid block (if no storage recess is desired), formed as a single open-ended box having four vertical walls surrounding a horizontal wall, or constructed in any other appropriate manner that enables the base 12 to function as generally described herein.

Referring to FIGS. 4-7, the front vertical wall 34 of the preferred base block 30 has a vertical outer wall section 35 providing the seat mounting surface 16, a vertical inner wall section 37 bounding a portion of the storage space $S_B$ and a generally horizontal upper wall section 39 connecting the inner and outer wall sections 35 and 37. The front wall 34 includes a pair of horizontally spaced-apart mounting holes 40 each extending through the inner and outer wall sections 35, 37, respectively and alignable with the threaded mounting holes 43 of the seat back 3, as described further below. Further, the front outer wall section 35 includes two horizontally spaced-apart mounting pockets or cavities 42 formed in the wall 34 generally below the two mounting holes 40. A vertically-extending mounting lug 44 is disposed in each mounting cavity 42 and is sized to fit within the notch (not shown) of one of the two seat back connective blocks 45. Further, the outer wall section 35 also preferably includes a pair of support cavities 46 each disposed inwardly of and adjacent to a separate one of the two mounting cavities 42.

The support cavities 46 each have a support surface 46a and are each configured to receive and support a separate one of the two seat back locator and support tabs 47 upon the support surface 46a so as to support a portion of the weight of the seat back 3, as discussed below.

Although the seat mounting portion 16 is preferably provided by the front wall 34 as described above, the mounting portion 16 may be provided by any other appropriate portion of the base 12 and/or may include any other appropriate structure for mounting the seat back 3 to the base 12. For example, the base 12 may be configured such that the seat back 3 is connectable to the upper end 30a of the base block 30 or to one or both side walls 36 (neither shown). Further for example, the base 12 may include a second set of mounting holes (not shown) in place of the lugs 44, be formed without the support cavities 46, be provided with mounting brackets (not shown), either integrally formed with the block 30 or separately attached, etc. The scope of the present invention includes these and all other appropriate alternative structures for mounting the seat back 3 to the base 12.

Figure 4:
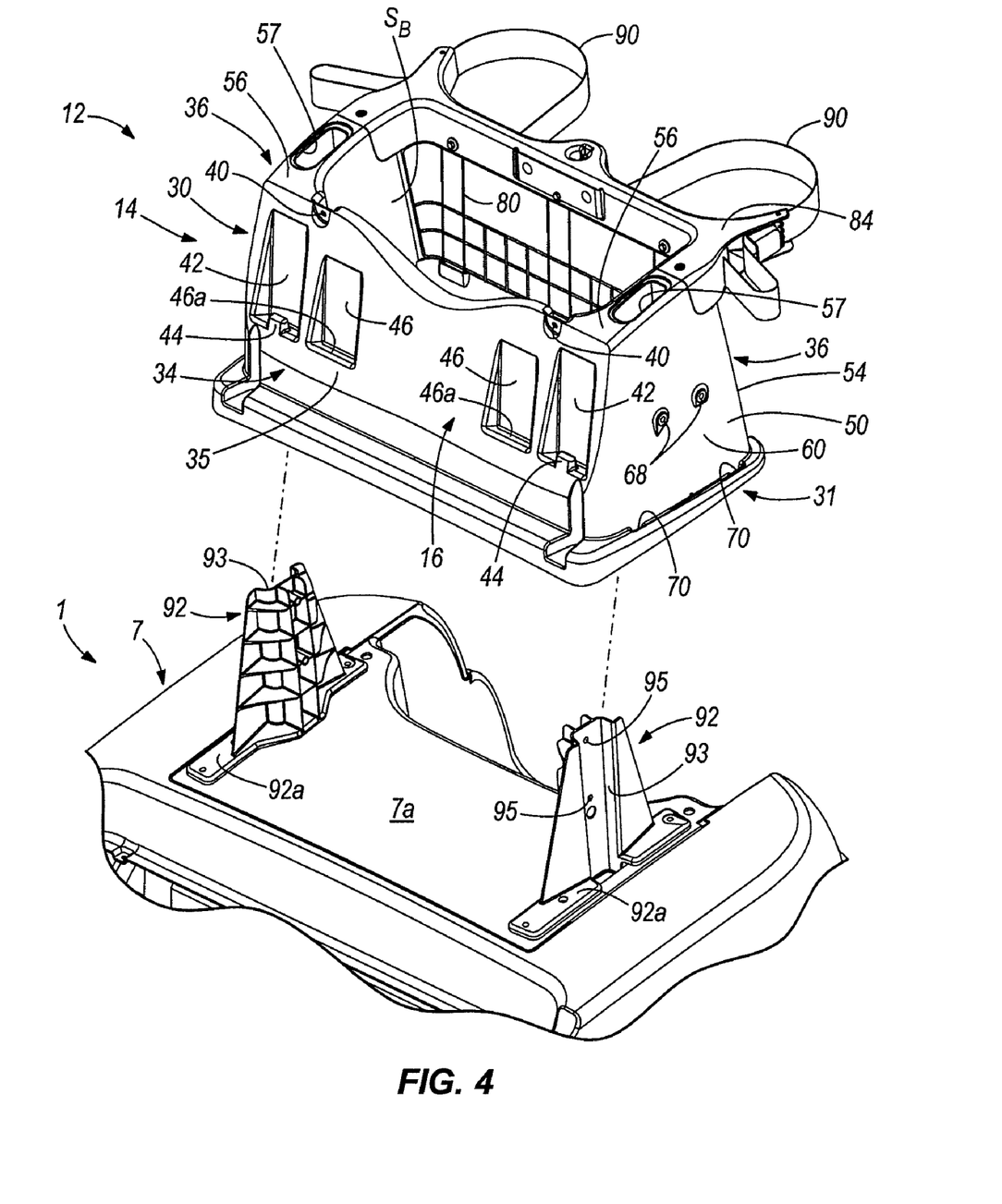
FIG. 4 is a broken-away, front perspective view of a base of the support device, shown spaced from the rear body portion.

Referring particularly to FIGS. 4 and 5, with the preferred structures of the seat back 3 and seat mounting portion 16 as described above, the seat back 3 is connected with the base 12 in the following manner. First, the seat back 3 is positioned against the base front wall 34 such that each mounting block 45 enters an associated mounting cavity 42 and each locator and support tab 47 is disposed in an associated support cavity 46. The tabs 47 are configured to interact with the two support cavities 46 such that when the tabs 47 are disposed within the cavities 46, the connective block recesses (not shown) of the seat back 3 are properly vertically aligned with the mounting lugs 44 of the base 12. The seat back 3 is then displaced downwardly until the mounting lugs 44 enter the connective block notches and the support blocks 47 rest upon the support cavity ledge surfaces 46a, providing additional support of the weight of the seat back 3. At this point, the through holes 40 in the base 12 are each aligned with a corresponding threaded hole 43 in the seat back 3, such that a threaded fastener (not indicated) is inserted through each pair of aligned openings 40, 43 to secure the seat back 3 to the base 12.

Referring now to FIGS. 3-7, the two side walls 36 of the base block 30 each extend rearwardly from the front wall 34 and are spaced apart across the width of the vehicle body 5. Preferably, each side wall 36 includes a vertical outer section 50 extending from the front wall outer section 35, a vertical inner section 52 extending from the front wall inner section 37, a vertical rear section 54 connecting the outer and inner sections 50, 52 and a horizontal upper section 56 extending between the front wall 34 and the three side wall vertical sections 50, 52 and 54. Each side wall outer section 50 provides an accessory mounting portion 60, as described below. The two side wall inner sections 52 bound opposing sides of the storage space $S_B$ and each includes a pair of vertically spaced apart through holes 53 used for fastening the base 12 to a pair of support posts 92, as discussed below. Further, each side wall upper section 56 has an upper opening 57 sized to receive one of the struts 26, as discussed in detail below, and a threaded opening 55, preferably provided by a threaded insert, used to connect a base ledge portion 84 to the block 30, as discussed below.

Furthermore, each side wall 36 bounds a side portion $S_{IS}$ of the body interior space $S_I$ and forms a side section 33a of the lower opening 33, the upper opening 57 extending into the space side portion $S_{IS}$ so as to be generally aligned with the lower opening side section 33a.

As such, each strut 26 is disposeable through the upper opening 57, the interior space side portion $S_{IS}$ and the lower opening side section 33a when the strut 26 is connected with the base 12, as discussed below, the upper opening 57, the interior space portion $S_{IS}$, and the lower opening section 33a forming a passage between the block upper and lower ends 30a, 30b, respectively.

Figure 12:
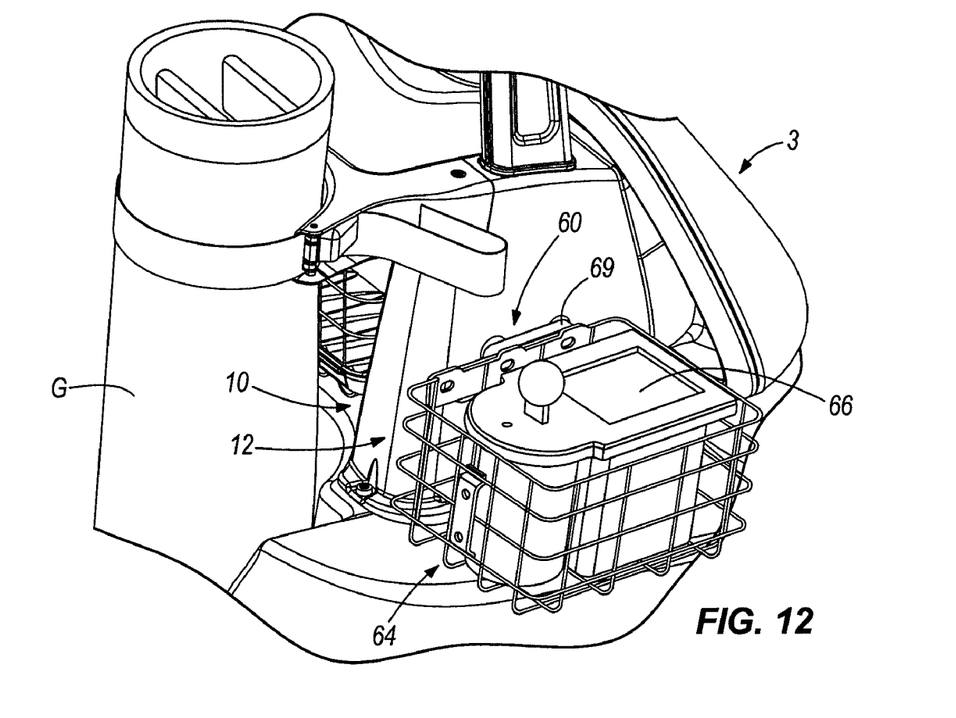
FIG. 12 is a broken-away, perspective view of the support device, showing a basket connected with an accessory mounting portion.
Figure 13:
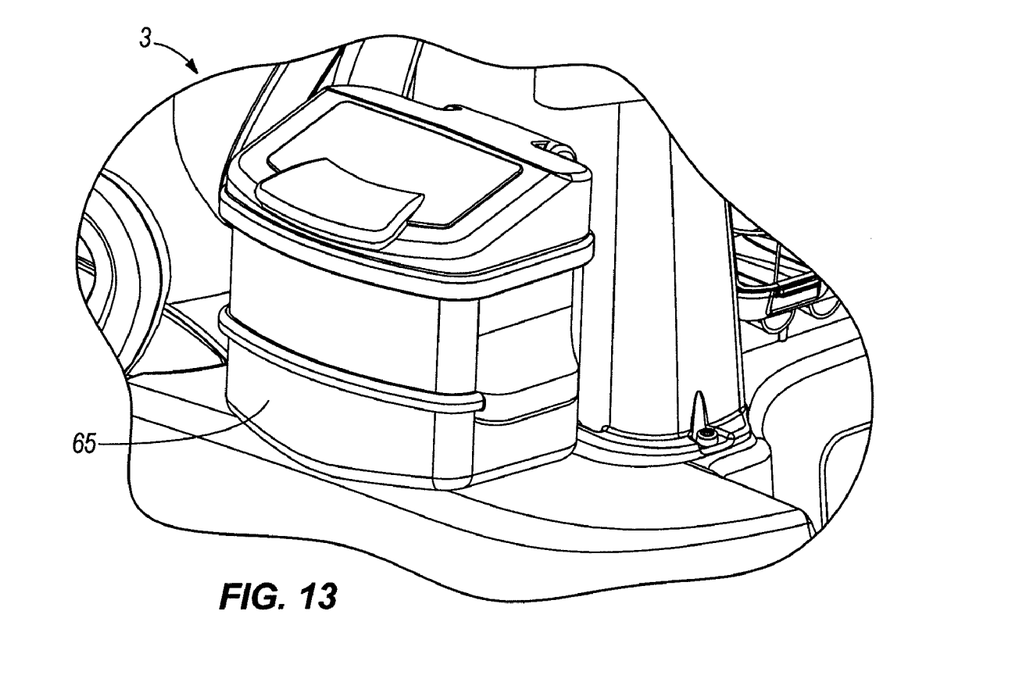
FIG. 13 is a broken-away, perspective view of the support device, showing a bucket attached to the accessory mounting portion.

Referring to FIGS. 3, 5 and 10-13, the base body 14 preferably further includes at least one and most preferably two accessory mounting portions or "mounts" 60. Each accessory mount 60 is formed in a separate one of the two side walls 36 and is configured to support at least one of a plurality of different accessories 62. Preferably, the accessories 62 include certain items considered beneficial for vehicle use on a golf course, including a sand bottle 63 (FIG. 11), a basket 64 (FIG. 12), a bucket 65 (FIG. 13) and a golf ball cleaner container 66 (FIG. 12). The accessory mounts 60 are each configured to separately attach at least two of these accessories and most preferably to separately attach all of the specified accessories 63, 64, 65 and 66 to the base 12.

Preferably, each accessory mount 60 includes a pair of mounting openings 68 spaced horizontally apart and extending into the side wall outer section 52, most preferably provided by a threaded insert disposed in the wall section 52. A pair of recesses or notches 70 are formed between the lower end of the side wall section 52 and an adjacent portion of the base ledge 31. The notches 70 are located generally below the openings 68 and are spaced apart horizontally by a greater distance than the openings 68, such that each notch 70 is slightly outboard of a proximal one of the two openings 68.

Preferably, an adapter bracket 69 is attachable to the side wall threaded openings 68 and is used to connect the various accessories 62 to the base 12, a generally T-shaped bracket 73 being used to connect the sand bottle 63 and the basket 64 and a generally rectangular bracket not shown being used to connect the bucket 65.

Further, the two notches 70 are each configured to receive a separate one of a pair of projections or lugs (not shown) extending from a lower portion of certain accessories, such as the basket 64, and spaced apart on the accessory about the same distance as the notches 70. Although the accessory mounts 60 are preferably each formed of the two mounting openings 68 and recesses 70 and an appropriate adapter bracket 69, the mounting portion/mounts 60 may alternatively be formed in any other appropriate manner, such as by a plurality of openings, one or more lugs, one or more different brackets, etc., and may be used with any other types of accessories 62.

Figure 6:
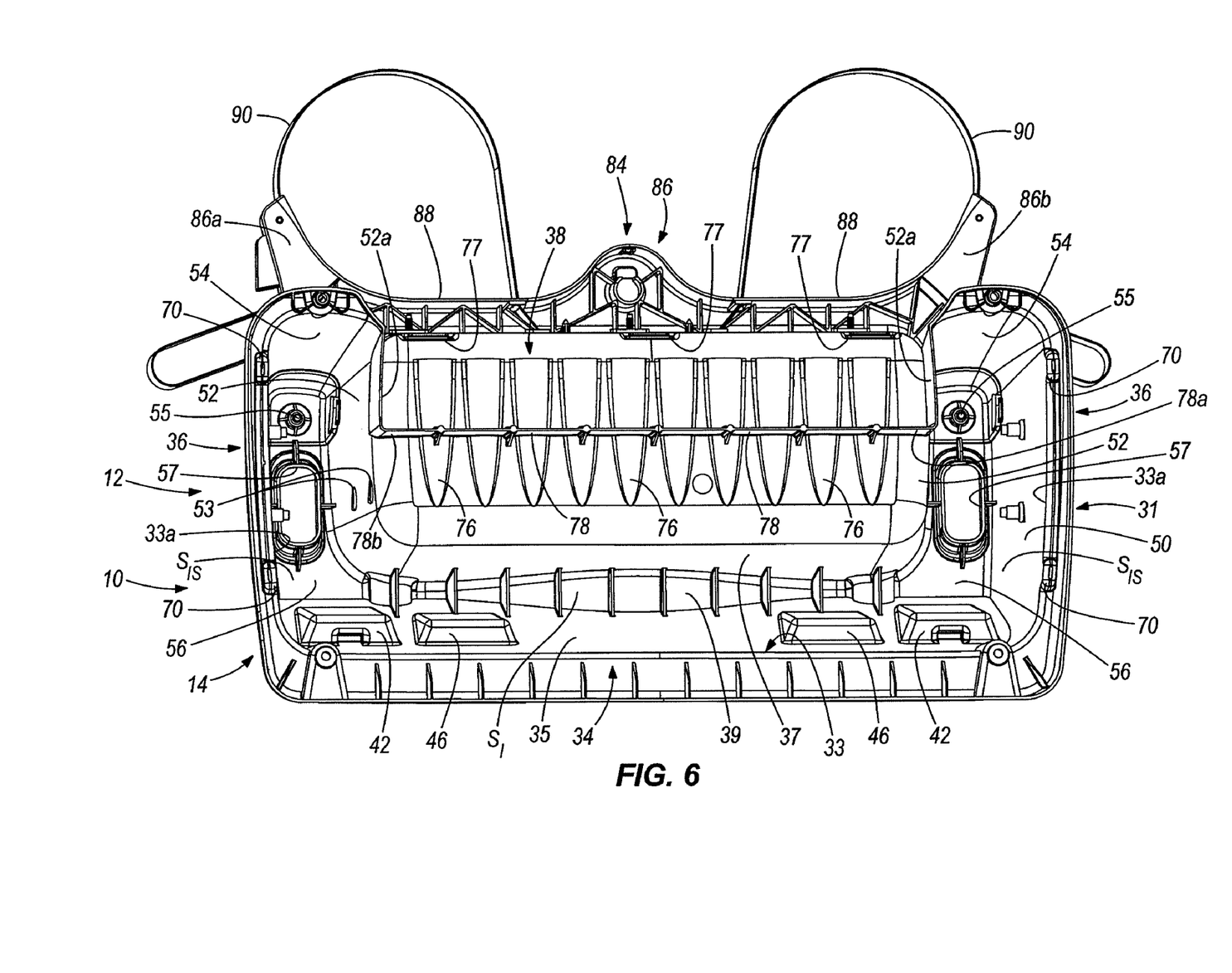
FIG. 6 is a bottom elevational view of the base.
Figure 7:
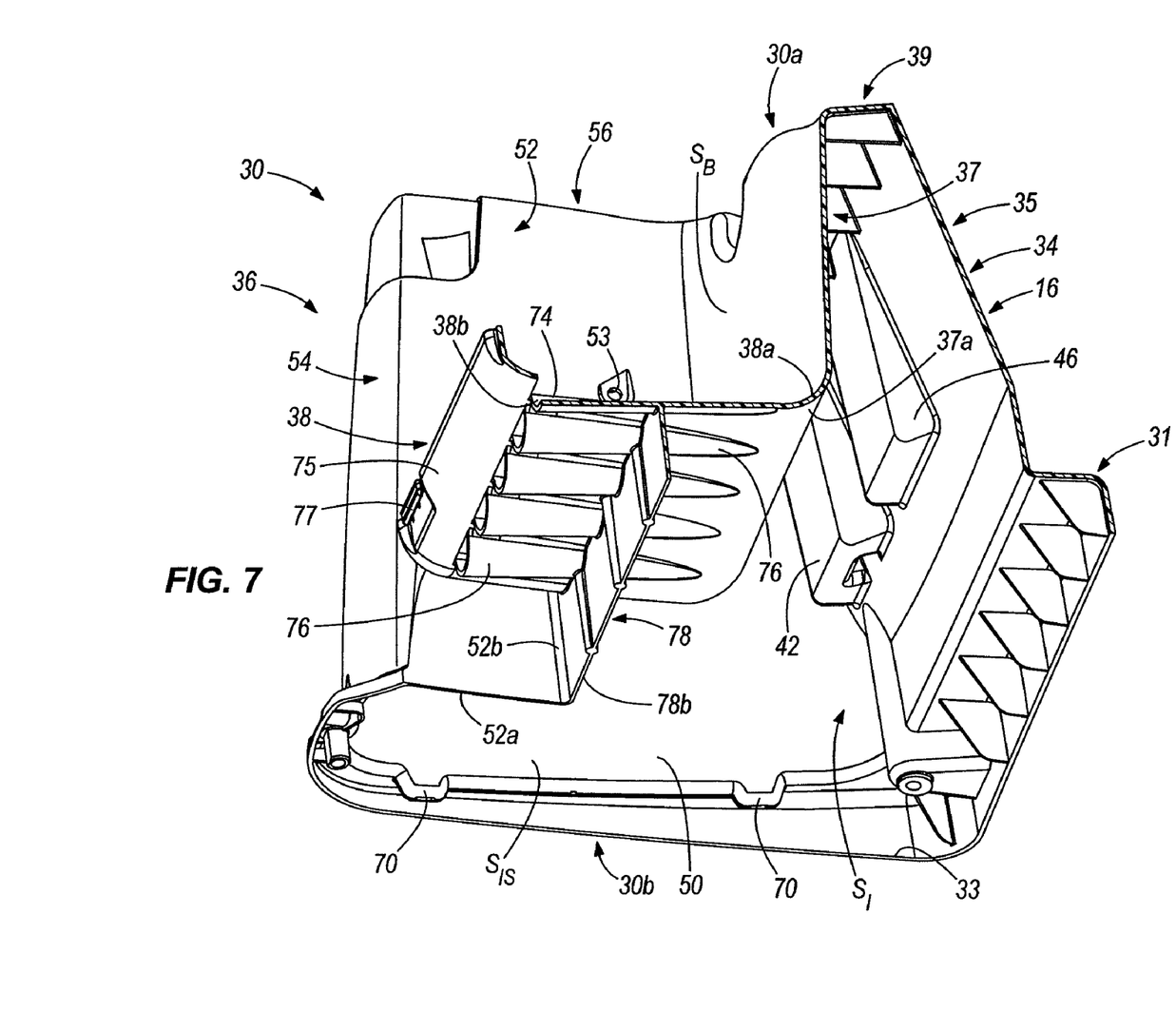
FIG. 7 is a cross-sectional, perspective view of the base.

Referring now to FIGS. 5-7, the horizontal wall 38 of the base block 30 extends rearwardly from the front wall 34 and between the two side walls 36 and provides a storage shelf 74, as discussed below. The horizontal wall 38 is preferably spaced vertically above the lower ends 52a of the side wall inner vertical sections 52 and has an inner edge 38a formed with the lower end 37a of the front wall inner vertical section 37, as best shown in FIG. 7. Preferably, the horizontal wall 38 has an upwardly-extending lip 75 formed along the wall outer edge 38b that includes a plurality of locking tabs 77 for connecting with a rear wall 80, as discussed below. Further, the horizontal wall 38 also preferably includes a plurality of reinforcing ribs 76 spaced between the two side walls 36 and provided to prevent bending of the wall 38 under the weight of items placed on the storage shelf 74. To provide additional reinforcement for the shelf 74, the base block 30 preferably further includes a vertical reinforcing wall 78 extending beneath and generally across the middle of the horizontal wall 38 and having opposing ends 78a, 78b formed with the inner vertical edges 52b of the side wall inner vertical section 52.

Preferably, the above-described four main walls 34, 36 and 38 and the reinforcing wall 78 of the block 30 are integrally connected or formed. As such, the base block 30 is therefor preferably of one-piece construction, as discussed above. However, the base body 14 may alternatively be formed of a plurality of separate sections or pieces connected together by appropriate means (e.g., threaded fasteners, adhesives, plastic fusion, etc.) so as to form the four primary walls 34, 36 and 38, and the reinforcing wall 78, of the block 30. Further, the base block 30 may alternatively be formed in any other appropriate shape, such as generally ovular or generally as a truncated pyramid and/or may be generally solid (i.e., as opposed to having a hollow interior space $S_I$) except for the recessed portion 32.

Referring to FIGS. 2 and 4-6, the base 12 preferably further includes a generally vertical rear wall 80 spaced rearwardly from the block front wall 34 and extending between the two block side walls 36. As such, the storage space $S_B$ is generally bounded by the three vertical walls 34 and 36 of the block 30, the vertical rear wall 80 and the block horizontal wall 38. Preferably, the rear wall 80 is formed as a separate member connected with the block 30, and most preferably as a generally flat wire screen or mesh 82 attached to a ledge portion 84 (discussed below) of the base 12 so as to extend between the rear sections 54 of the two side walls 36 and the rear lip 75 of the horizontal wall 38. The mesh 82 preferably includes a plurality of locking recesses 83 extending along a lower edge 82a and engageable by the locking tabs 77 on the block horizontal wall 38 to fasten together the two walls 38 and 80. Alternatively, the rear vertical wall 80 may be integrally formed with the block 30 or may be formed as a solid wall or plate (i.e. as opposed to a mesh or screen), or the base body 14 may be constructed without a rear wall 80 so as to have a generally open rear end (neither alternative shown).

Referring to FIGS. 2-6 and 10, preferably, the base body 14 further has a ledge portion 84 configured to support a golf bag G. The ledge portion 84 is preferably provided by a separate elongated bar 86 having opposing ends 86a, 86b each attached to a separate one of the two side walls 36, preferably by threaded fasteners (not indicated) inserted through the bar ends 86a, 86b and into the side wall threaded holes 55. Alternatively, the ledge portion 84 may be provided by an integral rear wall portion of the block 30 (structure not shown). The bar 86 has two rounded support surface sections 88 against each of which the upper end of a golf bag (not shown) is disposeable to store the bag within the vehicle 1, as discussed below. Further, the bar 86 also has two groups of three strap slots 87, each group of slots 87 being used to adjustably connect one cargo strap 90 to the base 12, as discussed below.

Figure 10:
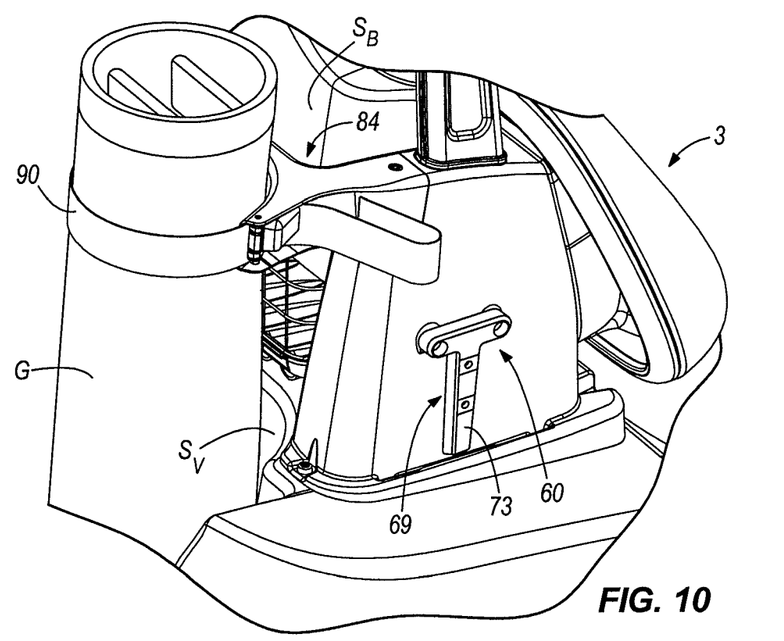
FIG. 10 is a broken-away, perspective view of the support device, showing an adaptor bracket attached to an accessory mounting portion.
Figure 11:
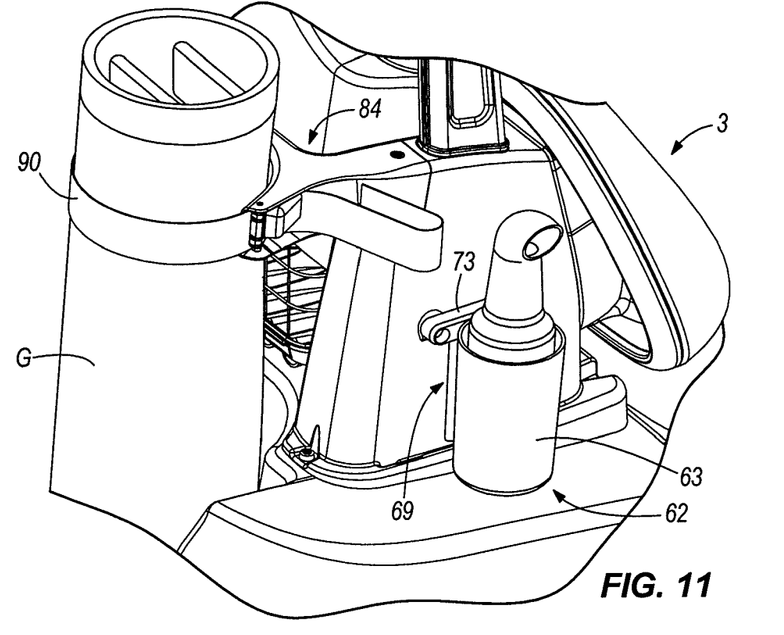
FIG. 11 is a broken-away, perspective view of the support device, showing a sand bottle connected with the accessory mounting portion.

Preferably, the base 12 further comprises at least one and preferably two cargo straps 90 attached to the ledge portion 84 of the base body 14 and each configured to retain one golf bag G disposed proximal to the base 12. More specifically, a golf bag G may be stowed on the vehicle 1 such that a lower portion of the bag G is located within the vehicle body storage space $S_V$ and the bag upper portion is disposed generally against one of the two support surfaces 88. As best shown in FIG. 10, each strap 90 is disposeable about the upper end of each golf bag G so as to secure the bag G generally against the base ledge portion 84, and thereby retain the bag G within the vehicle storage space $S_V$.

Figure 8:
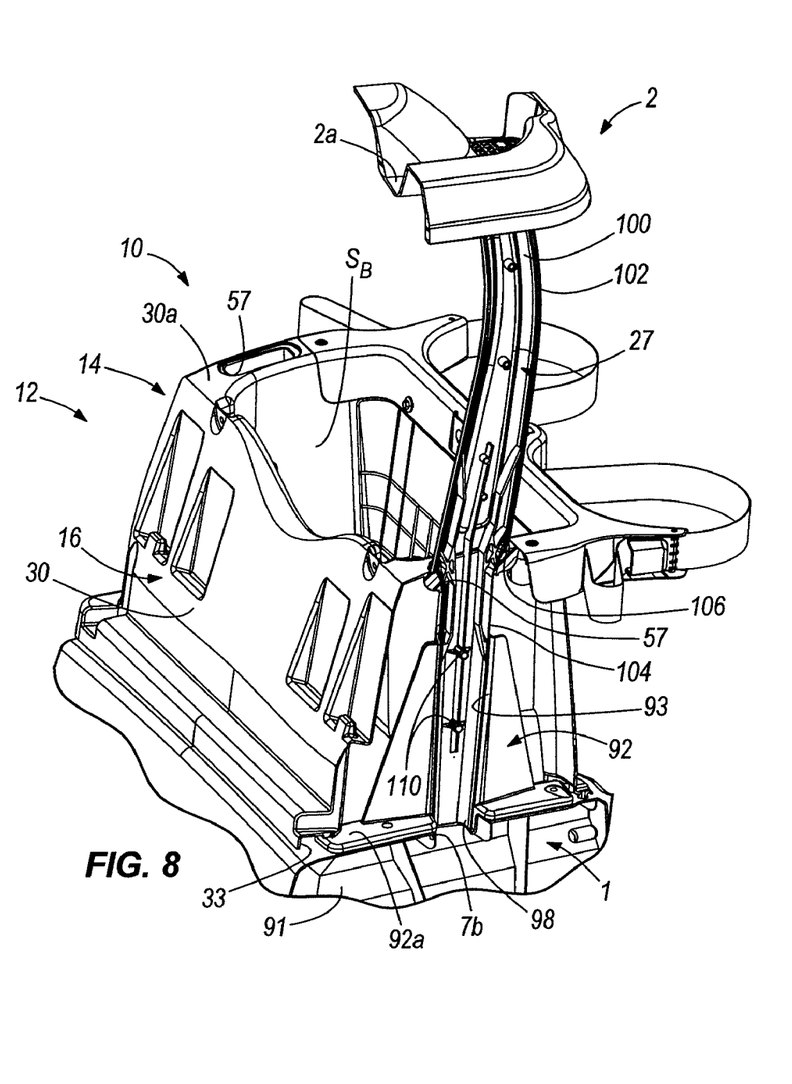
FIG. 8 is a broken-away view of the support device, showing a fluid path through one strut of the support device.
Figure 9:
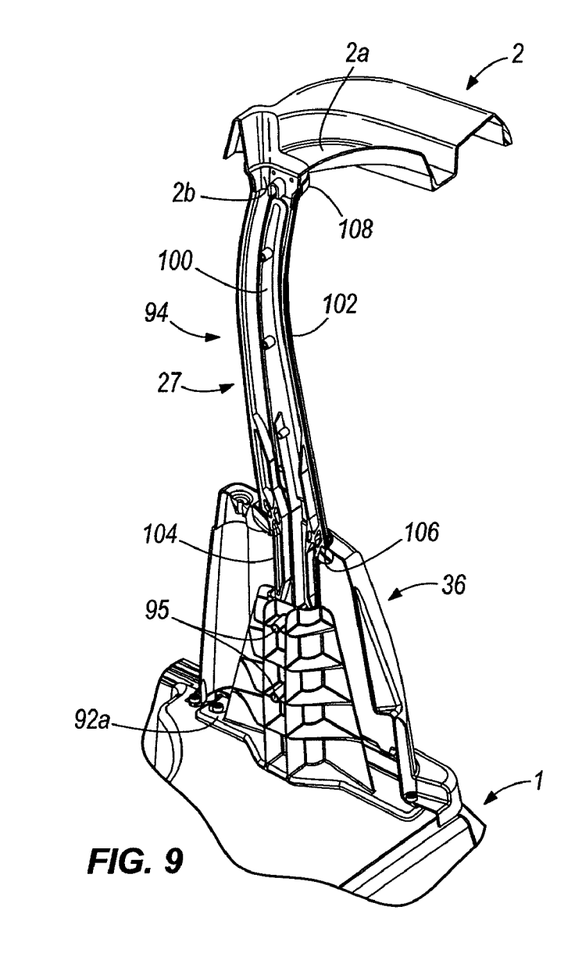
FIG. 9 is an enlarged, broken-away perspective view of one strut and a support post.

Referring now to FIGS. 4, 8 and 9, the base 12 preferably further comprises two generally triangular, vertically-extending support posts 92 connectable with the vehicle 1 configured to increase the rigidity of the base body 14 and also to assist channeling of the drainage flow from the struts 26, as discussed below. The two posts 92 each have a lower end 92a connectable with the vehicle body 5, preferably by a pair of threaded fasteners (not indicated), so as to be spaced apart laterally across the upper surface 7a of the rear body portion 7. Each post 92 is sized so as to be disposeable within the block interior space $S_I$, specifically within a separate one of the interior space side portions $S_{IS}$. Further, the support posts 92 each have a vertically-extending central groove or channel 93 that supports one of the preferred support struts 26, as described in further detail below, and a pair of vertically spaced-apart through holes 95 for connecting the post 92 with the base 12 and one of the struts 26, as discussed below.

When the posts 92 are mounted on the vehicle 1, the base 12 may be installed over the posts 92 until the base ledge 31 is disposed against the upper, mounting surface 7a of the rear body portion 7.

During installation, each post 92 enters one of the lower opening sections 33a of the base 12 and becomes disposed within the associated block interior space side portion $S_{IS}$. The base body 14 is then removably fastened to a mounting bracket 91 (FIG. 8) attached to the frame 4 by a plurality of threaded fasteners (not indicated), so as to sandwich sections of the rear body portion 7 between the base 12 and the bracket 91.

Further, the base body 14 is also removably fastened to each support post 92 (and each strut 26, as discussed below) by a pair of fasteners (not indicated) inserted through each pair of aligned holes 53 and 95 located respectively in each side wall inner section 52 and the proximal support post 92. Thus, the base 12 and the two support posts 92 are both fastened to the vehicle body 5 and to each other, thus forming a substantially rigid assembly. Although the base 12 preferably includes the support posts 92 to increase the rigidity of the preferred base block 30, the base 12 may alternatively be constructed without any posts 92, particularly if the base 12 were instead formed as a generally solid block (not shown), as discussed above.

With the preferred structure described above, the base 12 is configured to increase rigidity of the rear portion 7 of the vehicle body 5 when the support device 10 is connected with the vehicle 1. More specifically, when the base body 14 is attached to the vehicle body 5, the base 12 extends transversely across the upper surface 7a of the relatively thin rear body portion 7. The relatively thick base body 14, in combination with the support posts 92, reinforce the rear body portion 7 such that the ability of the body portion 7 to resist twisting or torsion is substantially increased. Although the base 12 is preferably connected with the vehicle frame 4 through two mounting brackets 91, the base 12 may alternatively be connected with the rear portion 7 or directly attached to the frame 4, as discussed above. For example, the body rear portion 7 may include a rectangular opening (not shown) through which the base 12 extends so as to be directly connected with the frame 4, such that the base 12 increases the rigidity of the vehicle body 5 by preventing the body rear portion 7 from twisting about the base body 14.

Referring now to FIGS. 1-3, 5, 8 and 9, as described above, the roof support 20 preferably includes at least one and most preferably two struts 26 each extending between the base 12 and the roof 2. Each strut 26 is attached to the base body 14 and is connectable with the vehicle roof 2, the struts 26 each being configured to at least partially retain or support the roof 2 spaced generally above a remainder of the vehicle 1.

Preferably, each strut 26 is formed as a separate (i.e. from the base 12) tubular member 94 connected with the base 12 and having opposing upper and lower open ends 96, 98 respectively providing the first and second support ends 22 and 24. Further, each strut 26 has an interior bore or passage 100 extending between the respective upper and lower ends 96, 98 and providing the downspout 27 for draining fluid from the roof 2, as discussed above and in further detail below.

Preferably, each tubular member 94 includes an upper tubular section 102, a lower tubular section 104 and a shoulder 106 at the interface between the two sections 102 and 104. The upper tubular section 102 provides the upper open end or inlet 96 and extends generally between the base 12 and the roof 2. A generally ovular cup portion 108 is formed at the upper end 96 of each tubular member 94 and is sized to fit about one of the drain portions 2b on the preferred roof 2, so as to fluidly connect the roof gutters 2a with the downspout 27. Further, each upper tubular section 102 includes a mounting hole 109 (FIG. 2) located proximal to the cup portion 108, a fastener (not shown) being inserted through the hole 109 and into the proximal canopy drain 2b to removably connect the canopy 2 to the strut 26, and thereby to the support device 10.

Further, the lower section 104 of each tubular member 94 provides the lower open end or outlet 98 and extends generally between the base upper and lower ends 30a, 30b, respectively, when the strut 26 is connected with the base 12. Each lower tubular section 104 is sized to fit through one of the base openings 57 and is disposeable within the channel 93 of the proximal support post 92. Also, the lower tubular sections 104 each have a pair of threaded openings 110 that are alignable with the pair of holes 95 in the associated support post 92. Preferably, the outlet 98 is disposable within an opening 7b in the vehicle rear body portion 7 that is located generally below the base lower end 30b and generally above one of the wheel wells 5a of the vehicle 1 (see FIG. 8). Thereby, the downspout 27 is arranged to discharge fluid into the wheel well 5a so as to fall onto the surrounding ground surface, as discussed in further detail below. Furthermore, when the lower tubular section 104 is located within the base 12 as described above, the shoulder 106 is disposed against portions of the side wall upper section 56 adjacent to the opening 57, as best shown in FIG. 8. As such, the shoulder 106 functions both to support the tubular member 94 upon the base 12 and to transfer the weight of the roof 2 from the upper tubular section 102 to the base 12.

With the structure described above, the two struts 26 each provide a fluid path through the downspout 27 from the associated gutter 2a of the roof 2 to the surrounding ground surface S in the following manner. Fluid in the gutters 2a flows through the drain portions 2b into the upper end 96 of the tubular member 94 and flows down the upper tubular portion 102. The fluid flow then enters the lower tubular portion 104, so as to flow through the base 12, and discharges through the lower open end 98. The flow exiting the lower open end 98 preferably falls through the wheel well 5a onto the surrounding ground surface, as discussed above. Alternatively, the strut lower open end 98 may be positioned to discharge the fluid flow through any other portion of the vehicle body 5, such as through the sides 1a or rear end 1b of the body 5, or may alternatively discharge the flow directly from the base 12, for example, through the side walls 36 (not preferred).

Further, the lower tubular portion 104 of each strut 26 may be sized such that the outlet 98 is located within the base side wall interior space $S_{IS}$, such that the fluid flow discharges through the upper opening 57 of the base 12 and thereafter through the wheel well 5a.

Although the roof support 20 is preferably formed as a pair of struts 26 as described above, it is within the scope of the present invention to construct the roof support 20 in any other appropriate manner. For example, the struts 26 may each be formed as a partial or "open" tube having an open channel providing the downspout 27 or may be formed as a solid member, such as a bar or elongated plate, without any gutter downspout 27. Further for example, the roof support 20 may be provided by a single elongated member or strut, by a rectangular frame or plate, and/or may be integrally formed with the base 12 (i.e., as opposed to removably connected). The present invention encompasses these and all other appropriate structures of the roof support 20 that enable the support device 10 that function generally as described herein.

Furthermore, the support device 10 may be constructed with a base 12 without a roof support 20, such support(s) (if required) being provided by one or more separate struts or other device connected with the vehicle 1 (none shown). In such an alternative construction, the base 12 would function to support the seat back 3 and provide the storage space $S_B$, and preferably also provide the accessory mounts 60. Further, such an alternative support device 10 still provides the benefit of increasing the rigidity of the vehicle body 5. Thus, the scope of the present invention includes both support devices 10 with a roof support 20 and support devices 10 unconnected with the roof or canopy of a vehicle 1.

Preferably, each of the main components of the preferred support structure, the block 30, the struts 26, the ledge portion 84 and the support posts 92 are each manufactured of a molded polymeric material, such as a thermoplastic resin, high density polyethylene, or any other appropriate polymeric material. The rear wall or mesh 82 is preferably formed of a plurality of wires or bars of a metallic material, such as low carbon steel, connected by appropriate means (e.g., soldering or welding) and the cargo straps 90 are preferably formed of strips of a fabric material, for example NYLON. However, any of the components or the entire support device 10 may be formed of any other material, for example, forming the block 30 of an aluminum alloy, and/or may be formed in any other appropriate process, such as fabricating the struts 26 as stampings.

Referring to FIGS. 2-5, the support device 10 is preferably assembled to the vehicle 1 in the following manner. The support posts 92 are first attached to the upper surface 7a of the rear body portion by four fasteners (not indicated) and then the base block 30 is assembled over the posts 92 and attached to the body 12 by a plurality of fasteners. Then, each strut 26 of the preferred roof support 20 is inserted through a separate opening 57 in the base 12 and a fastener (not indicated) is inserted through each aligned side wall opening 53, post opening 95, and strut threaded opening 110, such that the connected base 12, posts 92 and struts 26 form a substantially rigid assembly. The seat back 3 may then be assembled to the base 12, as described above, and then the roof or canopy 2 may be removably connected with the struts 26 by placing the drains 2b into the cup portions 108 of the struts 26 and inserting a fastener (not shown) through each strut mounting hole 109 and into the associated drain 2b. Thereafter, the accessory mounts 60 provided on the base 12 may be used to attach various items 62 to the vehicle 1, as discussed above. Further, when the gutters 2a become filled with rainwater, melted snow, etc., during use of the vehicle 1, such fluid empties from the gutters 2a to the surrounding ground surface(s) by flowing through the downspouts 27 within the two struts 26 and discharging within the wheel wells.

It will be appreciated by those skilled in the art that changes could be made to the embodiments or constructions described above without departing from the broad inventive concept thereof. It is understood, therefore, that this invention is not limited to the particular embodiments or constructions disclosed, but it is intended to cover modifications within the spirit and scope of the present invention as generally described herein.

We claim:

1. A support device for use on a vehicle, the vehicle including a frame, a vehicle body substantially covering the frame and defining a wheel well, a seat back, and a roof, the support device comprising:

a base body configured to connect to the vehicle body generally above the wheel well, the base body including a generally vertical front wall providing a seat mounting portion configured to support the seat back and a generally vertical side wall extending rearwardly from the front wall, the base body defining a recessed portion that provides a storage space;

a ledge portion coupled to the base body, the ledge portion including a coupling member to secure a golf bag to the base body;

an accessory mount coupled to the generally vertical side wall of the base body, the accessory mount configured to support a first accessory of a plurality of accessories and to support a second accessory of the plurality of accessories when the first accessory is removed from the accessory mount, the first accessory being different than the second accessory; and a roof support configured to support the roof generally above the vehicle body, the roof support including a first strut and a second strut, each of the first and second struts being at least partially supported by the base body and configured to connect to the vehicle body with the base body.

2. The support device of claim 1, wherein the generally vertical side wall of the base body is a first side wall, wherein the base body includes a second generally vertical side wall spaced apart from the first side wall and extending rearwardly from the front wall, and further comprising a mesh element extending between the first and second side walls and spaced rearwardly from the front wall.

3. The support device of claim 2, wherein the accessory mount is a first accessory mount, and further comprising a second accessory mount coupled to the second side wall, wherein the second accessory mount is configured to support a third accessory of the plurality of accessories and to support a fourth accessory of the plurality of accessories when the third accessory is removed from the second accessory mount, wherein the third accessory is different than the fourth accessory.

4. The support device of claim 1, wherein at least one of the first strut and the second strut defines an integral fluid passage to direct fluid from the roof through the base body.

5. The support device of claim 1, wherein the seat mounting portion includes a cavity and a lug disposed in the cavity, wherein the cavity is configured to receive a connective block of the seat back such that the lug engages the connective block to secure the seat back to the base body.

6. The support device of claim 1, wherein the coupling member of the ledge portion includes a strap.

7. The support device of claim 1, wherein the plurality of accessories includes at least one of a basket, a sand bottle, a bucket, a golf ball cleaner container, and an adapter bracket.

8. A support device for use on a vehicle, the vehicle including a vehicle body, a roof, and a support post extending from an upper surface of the vehicle body, the support device comprising:
   a base body configured to be positioned on the upper surface of the vehicle body, the base body defining a recessed portion that provides a storage recess and a passage extending through the base body adjacent to the storage recess, the passage configured to receive the support post to connect the base body to the vehicle body; and
   a strut configured to support the roof generally above the vehicle body, the strut including a first section extending through the passage of the base body and configured to connect to the support post, a second section extending away from the base body and configured to connect to the roof, and a shoulder formed between the first and second sections, the shoulder engaging a portion of the base body adjacent to the passage to support the strut on the base body and to transfer weight of the roof to the base body.

9. The support device of claim 8, wherein the base body defines a first hole, the support post defines a second hole, and the first section of the strut defines a third hole,
   wherein the first, second, and third holes are configured to substantially align when the base body is positioned on the upper surface of the vehicle body and the support post extends through the passage, and
   wherein a fastener is insertable through the first, second, and third holes to secure the base body and the strut to the support post.

10. The support device of claim 8, wherein, when the base body is installed on the vehicle body, the support post is disposed in the passage such that the base body and the vehicle body substantially enclose the support post.

11. The support device of claim 8, wherein the vehicle includes a second support post extending from the upper surface of the vehicle body, wherein the base body defines a second passage extending through the base body adjacent to the storage recess and configured to receive the second support post, and further comprising:
   a second strut configured to support the roof generally above the vehicle body, the second strut including a first section extending through the second passage of the base body and configured to connect to the second support post, a second section extending away from the base body and configured to connect to the roof, and a shoulder formed between the first and second sections, the shoulder engaging a portion of the base body adjacent to the second passage to support the second strut on the base body and to transfer weight of the roof to the base body.

12. The support device of claim 8, wherein the strut defines an integral fluid passage to direct fluid from the roof through the base body.

13. The support device of claim 8, wherein the vehicle includes a seat back, and wherein the base body includes a seat mounting portion configured to support the seat back.

14. The support device of claim 8, further comprising a ledge portion coupled to the base body, wherein the ledge portion includes a coupling member to secure a golf bag to the base body.

15. The support device of claim 8, further comprising an accessory mount coupled to a generally vertical side wall of the base body, wherein the accessory mount is configured to support a first accessory of a plurality of accessories and to support a second accessory of the plurality of accessories when the first accessory is removed from the accessory mount, and wherein the first accessory is different than the second accessory.

16. The support device of claim 15, wherein the plurality of accessories includes at least one of a basket, a sand bottle, a bucket, a golf ball cleaner container, and an adapter bracket.

17. A vehicle comprising:
   a frame;
   a vehicle body substantially covering the frame and defining a wheel well;
   a seat back;
   a roof positioned generally above the vehicle body; and
   a support device including
      a base body removably connected to the vehicle body generally above the wheel well, the base body including a generally vertical front wall providing a seat mounting portion to support the seat back and a generally vertical side wall extending rearwardly from the front wall, the base body defining a recessed portion that provides a storage space,
      a ledge portion coupled to the base body, the ledge portion including a coupling member to secure a golf bag to the base body,
      an accessory mount coupled to the generally vertical side wall of the base body, the accessory mount configured to support a first accessory of a plurality of accessories and a second accessory of a plurality of accessories when the first accessory is removed from the accessory mount, the first accessory being different than the second accessory, and
      a roof support to support the roof generally above the vehicle body, the roof support including a first strut and a second strut, each of the first and second struts being at least partially supported by the base body and connected to the vehicle body with the base body.

18. The vehicle of claim 17, wherein the generally vertical side wall of the base body is a first side wall, and wherein the base body includes a second generally vertical side wall spaced apart from the first side wall and extending rearwardly from the front wall, and wherein the support device further includes a mesh element extending between the first and second side walls and spaced rearwardly from the front wall.

19. The vehicle of claim 18, wherein the accessory mount is a first accessory mount and the support device further includes a second accessory mount coupled to the second side wall, wherein the second accessory mount is configured to support a third accessory of the plurality of accessories and to support a fourth accessory of the plurality of accessories when the first accessory is removed from the accessory mount, and wherein the third accessory is different than the fourth accessory.

20. The vehicle of claim 17, wherein at least one of the first strut and the second strut defines an integral fluid passage, and wherein the integral fluid passage directs fluid from the roof through the base body and discharges the fluid through the wheel well of the vehicle body.

21. The vehicle of claim 17, wherein the seat back includes a connective block and the seat mounting portion includes a cavity and a lug disposed in the cavity, and wherein the cavity receives the connective block such that the lug engages the connective block to secure the seat back to the base body.

22. The vehicle of claim 17, wherein the coupling member of the ledge portion includes a strap.

23. The vehicle of claim 17, wherein the plurality of accessories includes at least one of a basket, a sand bottle, a bucket, a golf ball cleaner container, and an adapter bracket.

24. A vehicle comprising:
a vehicle body having an upper surface;
a roof positioned generally above the upper surface of the vehicle body;
a support post connected to and extending from the upper surface of the vehicle body;
a base body positioned on the upper surface of the vehicle body, the base body defining a recessed portion that provides a storage recess and a passage extending through the base body adjacent to the storage recess, the passage receiving the support post to connect the base body to the vehicle body; and
a strut to support the roof generally above the vehicle body, the strut including a first section extending through the passage of the base body and connected to the support post, a second section extending away from the base body and connected to the roof, and a shoulder formed between the first and second sections, the shoulder engaging a portion of the base body adjacent to the passage to support the strut on the base body and to transfer weight of the roof to the base body.

25. The vehicle of claim 24, wherein the base body defines a first hole, the support post defines a second hole, and the first section of the strut defines a third hole,
wherein the first, second, and third holes are substantially aligned, and
wherein a fastener is insertable through the first, second, and third holes to secure the base body and the strut to the support post.

26. The vehicle of claim 24, wherein the support post is disposed in the passage such that the base body and the vehicle body substantially enclose the support post.

27. The vehicle of claim 24, wherein the base body defines a second passage extending through the base body adjacent to the storage recess, and further comprising:
a second support connected to and extending from the upper surface of the vehicle body, the second strut being received in the second passage of the base body to connect the base body to the vehicle body; and
a second strut to support the roof generally above the vehicle body, the second strut including a first section extending through the second passage of the base body and connected to the second support post, a second section extending away from the base body and connected to the roof, and a shoulder formed between the first and second sections, the shoulder engaging a portion of the base body adjacent to the second passage to support the second strut on the base body and to transfer weight of the roof to the base body.

28. The vehicle of claim 24, wherein the strut defines an integral fluid passage to direct fluid from the roof through the base body.

29. The vehicle of claim 24, further comprising a seat back, wherein the base body includes a seat mounting portion to support the seat back.

30. The vehicle of claim 24, further comprising a ledge portion coupled to the base body, wherein the ledge portion includes a strap to secure a golf bag to the base body.

31. The vehicle of claim 24, further comprising an accessory mount coupled to a generally vertical side wall of the base body,
wherein the accessory mount is configured to support a first accessory of a plurality of accessories and to support a second accessory of a plurality of accessories when the first accessory is removed from the accessory mount,
wherein the first accessory is different than the second accessory, and
wherein the plurality of accessories includes at least one of a basket, a sand bottle, a bucket, a golf ball cleaner container, and an adapter bracket.

* * * * *